(12) United States Patent
Carimalo et al.

(10) Patent No.: US 7,338,163 B2
(45) Date of Patent: Mar. 4, 2008

(54) PROGRESSIVE OPHTHALMIC LENS

(75) Inventors: Celine Carimalo, Issy-les-Moulineaux (FR); Cyril Guilloux, Paris (FR); Eric Roland, Voisenon (FR)

(73) Assignee: Essilor International (Compagnie Generale d'Optique), Charenton Cedex (FR)

( * ) Notice: Subject to any disclaimer, the term of this patent is extended or adjusted under 35 U.S.C. 154(b) by 0 days.

(21) Appl. No.: 11/569,910

(22) PCT Filed: May 31, 2005

(86) PCT No.: PCT/FR2005/001329

§ 371 (c)(1),
(2), (4) Date: Dec. 1, 2006

(87) PCT Pub. No.: WO2006/000682

PCT Pub. Date: Jan. 5, 2006

(65) Prior Publication Data

US 2007/0242217 A1    Oct. 18, 2007

(30) Foreign Application Priority Data

Jun. 3, 2004    (FR) .................................. 04 06002

(51) Int. Cl.
*G02C 7/06*    (2006.01)

(52) U.S. Cl. ....................................... 351/169; 351/177
(58) Field of Classification Search ................ 351/169, 351/177
See application file for complete search history.

(56) References Cited

U.S. PATENT DOCUMENTS

| 4,537,479 A | 8/1985 | Shinohara et al. .......... 351/169 |
| 6,102,544 A * | 8/2000 | Baudart et al. ............. 351/169 |
| 6,116,734 A | 9/2000 | Pedrono et al. ............. 351/169 |

FOREIGN PATENT DOCUMENTS

| FR | 2704327 | 10/1994 |
| FR | 2769997 | 4/1999 |
| GB | 2277997 | 11/1994 |

* cited by examiner

*Primary Examiner*—Scott J. Sugarman
(74) *Attorney, Agent, or Firm*—Fish & Richardson P.C.

(57) ABSTRACT

The invention relates to an ophthalmic lens for long-sighted and intermediate vision comprising a complex surface provided with an optical centre, a substantially umbilicated meridian line and an average size sphere progression on the top surface equal to or greater than 0.50 diopters. The complex surface is provided in the top part thereof with a long-sighted vision area which is formed by cylinder points equal to or less than 0.25 diopters and covers an angular sector focused on the optical centre and whose angle is equal to 160°. Said complex surface also comprises an average size substantially constant sphere on the meridian line in the long-sighted vision area and a progression length equal to or less than 12 mm. Said progression length is defined as a vertical distance between the optical centre and a median point for which the average sphere if greater than 85% of progression on the average sphere in the optical centre. The inventive lens is suitable for driving and prescribed to persons having additional prescription greater than a power progression, whereby a correction adaptable to the power prescription of a longsighted vision person is provided in the top part of the lens. The lower part of the lens ensures the correction needed for an intermediate vision person.

13 Claims, 10 Drawing Sheets

PROGRESSIVE OPHTHALMIC LENS

CROSS-REFERENCE TO RELATED APPLICATIONS

This application is a national phase application under 35 U.S.C. § 371 of PCT International Application No. PCT/FR2005/001329, filed May 31, 2005, which claims priority to French Application Serial No. 0406002 filed Jun. 3, 2004.

BACKGROUND OF THE INVENTION

The present invention relates to an ophthalmic lens.

Ophthalmic lenses designed to be fitted into a frame involve a prescription. The ophthalmic prescription can include a positive or negative power prescription as well as an astigmatism prescription. Such prescriptions correspond to corrections enabling the wearer of the lenses to correct defects of his or her vision. A lens is fitted in the frame in accordance with the prescription and with the position of the wearer's eyes relative to the frame.

In the simplest cases, the prescription is nothing more than a power prescription. The lens is said to be unifocal and has an axis of symmetry. It is fitted in a simple manner in the frame so that the principal direction of glance of the wearer coincides with the axis of symmetry of the lens.

For presbyopic wearers, the value of the power correction is different for far vision and near vision, due to the difficulties of accommodation in near vision. The prescription thus comprises a far-vision power value and an addition (or power progression) representing the power increment between far vision and near vision; this comes down to a far-vision power prescription and a near-vision power prescription. Lenses suitable for presbyopic wearers are progressive multifocal lenses; these lenses are described for example in FR-A-2 699 294, U.S. Pat. Nos. 5,270,745 or 5,272,495, FR-A-2 683 642, FR-A-2 699 294 or also FR-A-2 704 327. They are generally determined by optimization, based on a certain number of constraints imposed on the different characteristics of the lens. These lenses are all-purpose lenses in that they are adapted to the different needs of the wearer at the time.

For young presbyopics, lenses have been proposed which do not have a far-vision region with a reference point, unlike standard progressive multifocal lenses; these lenses are described in FR-A-2 588 973. These lenses are prescribed only in accordance with the power required by the wearer in near vision, regardless of the power required by the wearer in far vision. The lens provides a central part which has an additional spherical power offering the wearer satisfactory near vision. It also has a slight decrease in power in the upper part, which gives the wearer clear vision even beyond the normal near-vision field. Finally, the lens has a point with a power value equal to the nominal near-vision power, a higher-power region in the lower part of the lens and a lower-power region in the upper part of the lens.

FR-A-2 769 997 discloses a lens which, compared with a standard progressive multifocal lens, has a more stabilized and larger near-vision region, a significant increase in the field widths in near vision and intermediate vision, as well as a reduction in aberrations and in particular of astigmatism. It provides a suitable correction for distances between 40 and 80 cm and, in most cases, for distances between 40 cm and 2 in. This lens is actually a near-vision—intermediate-vision mid-distance lens, favoring near vision while providing clear vision beyond the normal near-vision field. On the other hand, no far vision is available. This lens solution proves particularly well suited to computer work. It is prescribed for young presbyopics, solely in accordance with the prescription for near vision. The rear face of the lens is machined in order to provide a near-vision power matching the prescription, without taking account of the far vision prescription. Two front faces are sufficient to meet all of the wearer's needs.

Multifocal lenses, whether they are progressive or intended purely for near vision, can include a complex multifocal face (i.e. assuming no axis of revolution, typically a surface having a power progression), for example the face facing the person wearing the glasses, and a spherical or toric face, called the prescription face. This spherical or toric face allows the lens to be adapted to the user's ametropia, so that a multifocal lens is generally defined only by its complex surface. For a given product different complex faces are defined in accordance with the addition and the base (or mean far-vision sphere). Starting from semi-finished lenses, of which only the multifocal face is contoured, it is possible to prepare lenses suited to each wearer, by simple machining of a spherical or toric prescription face.

Independently of the power prescription, a wearer may be given an astigmatism prescription. Such a prescription is produced by the ophthalmologist in far vision in the form of a pair of values formed by an axis value (in degrees) and an amplitude value (in diopters). On a surface, the amplitude value represents the difference $1/R_1-1/R_2$ between the principal curvatures; the axis value represents the orientation, relative to a reference axis and in a conventional direction of rotation, of the maximum curvature $1/R_1$. In prescription terms, the amplitude value represents the difference between the minimum and maximum powers in a given direction and the axis represents the orientation of the maximum power. The term astigmatism is used for the pair (amplitude, angle); this term is also sometimes used, although this is linguistically incorrect, for the amplitude of the astigmatism. The context allows a person skilled in the art to understand which meaning is intended.

French patent application filed on Aug. 8, 2003 under number 03 09787 and entitled "Method for determination of an ophthalmic lens using a near-vision and far-vision astigmatism prescription" discloses the determination of a lens according to a far-vision and near-vision astigmatism prescription. This application includes definitions of optical power and of astigmatism.

SUMMARY OF THE INVENTION

The invention discloses a lens which is more easily tolerated than standard ophthalmic lenses and easier to prescribe; it makes it possible to provide the wearer with the advantages of a far-vision unifocal lens and also with intermediate vision. The lens of the invention is in particular suited to presbyopic activities not requiring a fill power progression—typically a power progression less than or equal to 2 diopters. The lens of the invention is in particular suited to activities like driving a vehicle.

Consequently, the invention provides, in one embodiment, an ophthalmic lens intended for far vision and intermediate vision, having a complex surface with an optical center, a substantially umbilical meridian, a mean-sphere progression on the meridian greater than or equal to 0.5 diopters, the complex surface having:

in its upper part, a far-vision region formed by points where cylinder is less than or equal to 0.25 diopters and covering an angular sector centered on the optical center and with a 160° angle;

substantially constant mean sphere on the meridian in the far-vision region;

a progression length less than or equal to 12 mm, progression length being defined as the vertical distance between the optical center and a point on the meridian for which mean sphere is higher by 85% of said mean-sphere progression than mean sphere at the optical center.

The lens can also have one or more of the following characteristics:

the meridian is rectilinear; in this case, the complex surface can be symmetrical relative to the meridian;

the lens has, for the part of the lens more than 5 mm below the optical center, a distance between the 0.50 diopter isocylinder lines less than or equal to 10 mm;

the lens has, in the far-vision region, a mean sphere variation less than or equal to 0.025 diopters, for a mean sphere progression less than or equal to 0.90 diopters;

the lens has, in the far-vision region, a mean sphere variation less than or equal to 0.08 diopters, for a mean sphere progression between 1.05 and 1.40 diopters;

the lens has a mean sphere progression between 0.5 and 0.9 diopters;

the lens has a mean sphere progression between 1.05 and 1.40 diopters;

the lens has an addition prescription for the wearer greater than mean sphere progression.

The invention also provides visual apparatus including at least one such lens. It also provides a method for correcting the vision of a presbyopic subject, which comprises providing the subject with, or the wearing by the subject of, such apparatus.

In the method, a lens of the apparatus can have a mean sphere progression on the surface less than the difference between near-vision power and far-vision power prescribed for the subject.

Finally, the invention provides a method for fitting such a lens in visual apparatus, comprising:

measuring the position in the apparatus of the subject's glance in far vision, and fitting of a lens in the apparatus, with the optical center at the measured position.

Other advantages and characteristics of the invention will become apparent on reading the following description of embodiments of the invention, given by way of example and with reference to the drawings.

DETAILED DESCRIPTION OF PREFERRED EMBODIMENTS

Figure 1:
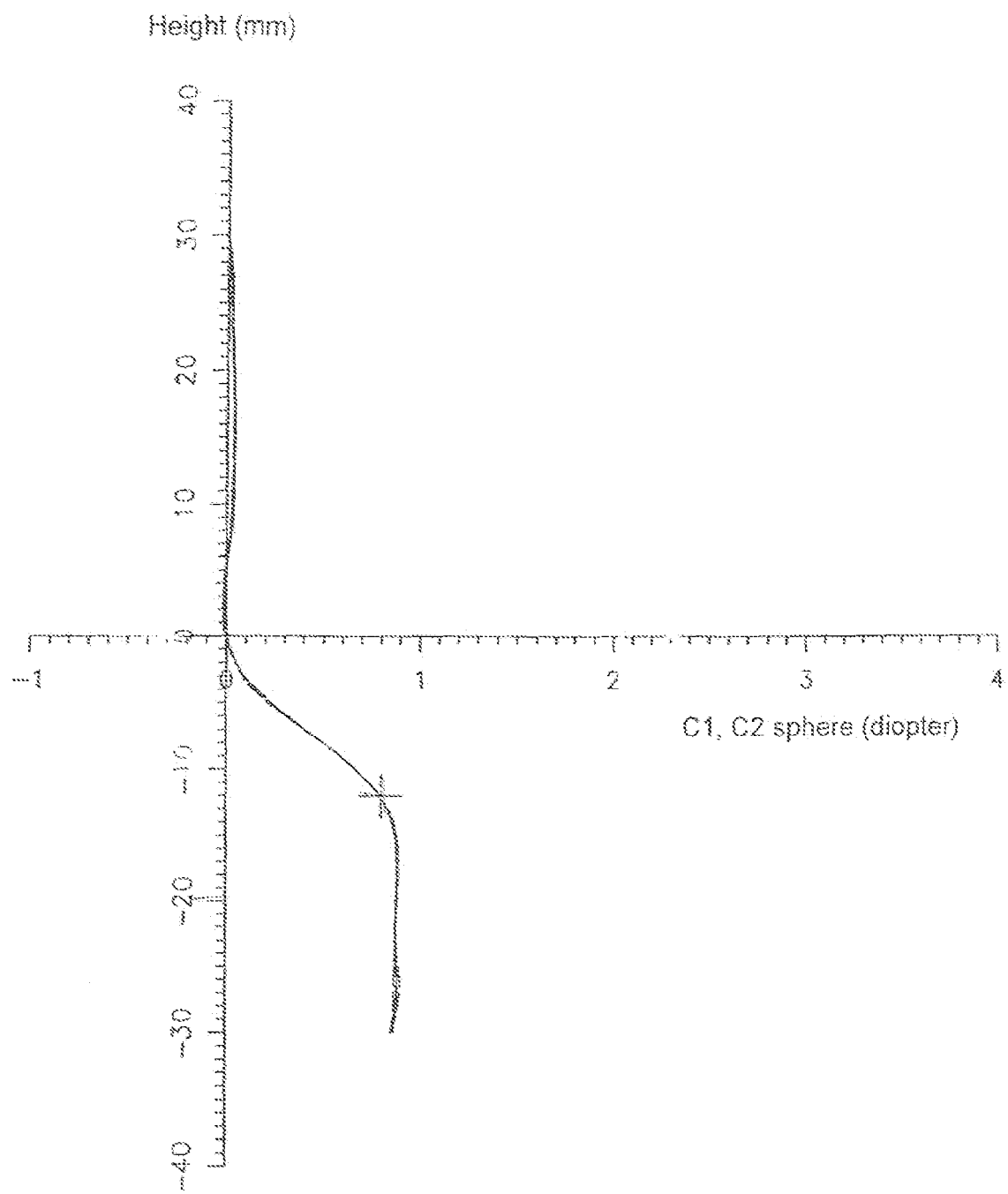
FIG. 1 shows the principal curvatures and a plot of sphere on the axis of a lens according to a first embodiment of the invention.

In the rest of the description, for the sake of simplicity, the case of a lens having one complex surface and one spherical or toric surface is considered. The complex face of the lens can be the front face (remote from the wearer), as is the case for progressive multifocal lenses of the state of the art. Lenses with a radius of 30 mm are considered.

In a manner known per se, at any point of a complex surface, a mean sphere D given by the formula:

$$D = \frac{n-1}{2}\left(\frac{1}{R_1} + \frac{1}{R_2}\right)$$

is defined, where $R_1$ and $R_2$ are the maximum and minimum curvature radii expressed in metres, and n is the index of the material constituting the lens.

A cylinder C, given by the formula:

$$C = (n-1)\left|\frac{1}{R_1} - \frac{1}{R_2}\right|,$$

is thus defined.

The norm of the cylinder gradient vector is also known as the cylinder slope. This definition is independent of the reference frame, but can be written, in an orthonormalized reference frame:

$$\|\overline{gradC}\| = \sqrt{\left(\frac{\partial C}{\partial x}\right)^2 + \left(\frac{\partial C}{\partial y}\right)^2}$$

The characteristics of the complex face of the lens can be expressed using mean sphere and cylinder.

The invention provides a lens having the advantages of a far-vision unifocal lens along with the provision of intermediate vision.

The lens is suited to situations in which the wearer requires a clear far vision with an unimpeded field, whilst having very little or no need for near vision. The lens provides a solution better suited to this requirement than that provided by a standard progressive multifocal lens: the solution provides clear and broad far vision; the available field in far vision is larger than that of a standard lens. Sharpness of vision can be evaluated in particular by lens aberration, in particular by the cylinder or the cylinder slope. The solution proposed also provides good peripheral vision in the lateral regions in far vision.

The solution proposed also provides suitable intermediate vision, allowing the wearer to see satisfactorily at distances greater than or equal to approximately 80 cm. The lens is in fact a lens suited to far vision and to intermediate vision.

The lens is in particular suited to driving a vehicle. For this activity drivers essentially require unimpeded far vision, peripheral vision which is not disturbed in far vision and accessible intermediate vision, in particular when stationary. By contrast, the wearer hardly uses his near vision. The lens therefore makes it possible in particular to maximize far vision acuity and to minimize the dynamic distortion. Far vision is therefore effective for looking at the road or rear-view mirrors. In the lower part of the lens, the intermediate vision makes it possible for example to consult navigation instruments such as the speedometer, the knob for controlling the air flow and/or the car radio. The lower part of the lens can be used, in particular when stationary for intermediate vision, with a reduced width of vision.

The lens has a prescription which is such that the power prescribed for the wearer in near vision is not achieved on the lens; in other words, as indicated below, progression in optical power or mean sphere of the lens is less than the difference between the wearer's near vision prescription and the wearer's far vision prescription. The lower part of the lens is therefore an intermediate vision region, in that the correction provided for the wearer corresponds to the correction which he or she requires in intermediate vision, but not in near vision. The intermediate-vision distance is for example chosen to be of the order of 80 cm.

The lens is described in the following with reference to two embodiments. The first embodiment, represented in FIGS. 1 to 5, is suitable for presbyopic wearers who have a prescription for a power progression of less than two diopters. The optical power on the lens varies by 0.75 diopters. The second embodiment is represented in FIGS. 6 to 10 and is suitable for presbyopic wearers who have a prescription for a power progression greater than or equal to two diopters. The optical power on the lens varies by 1.25 diopters.

In the two embodiments described below, the lens is substantially symmetrical and the vertical axis of the lens is an umbilical line, on which the astigmatism is nil. This allows the same lens to be used for the right eye and for the left eye. The lens can be fitted in the frame keeping the axis of symmetry vertical; in fact, in far vision or in intermediate vision, the convergence is not significant and it is not necessary for the umbilical line to be inclined.

It is also possible to apply the invention to lenses having an inclined meridian or umbilical line, or also to an asymmetrical lens. For the fitting of the lens it is also possible to adopt an inclination of the axis. This could be the case if the activity for which the lens is intended involves a preference for viewing to one side or the other.

FIG. 1 shows a diagram of the principal curvatures and of the sphere on the axis of a lens according to a first embodiment of the invention. The points on the complex surface of the lens are plotted on FIG. 1—and on FIGS. 2 to 4—relative to an orthonormalized reference frame, the center of which is superposed on the optical center of the lens, the ordinates axis of which is vertical and the abscissa axis is horizontal. In other words, the axis of symmetry of the lens is the ordinates axis. In FIG. 1 the curvature or the sphere is plotted on the abscissa axis in diopters; the position on the lens is marked on the ordinates axis in millimeters. FIG. 1 also shows at the ordinate y=0 mm, the centering point of the lens; this is a point produced on the lens which is used by the optician for fitting the lens in the frame, as explained below.

The centering point of the lens, considered below, often merges with the geometrical center of the lens before trimming. More generally, the centering point can be defined in one of the following ways:

the point situated on the lens half way between two markings on the lens surface;

the point showing the prism prescribed for the wearer in far vision ("optical center");

the point produced on the lens, before fitting in the frame, by a cross or any other mark such as a dot surrounded by a circle traced on the lens;

the point used by opticians in order to position the lens in the frame.

In practice, these definitions cover the same point on the lens. As explained below, this point is advantageously used for the fitting of the lens in the frame.

FIG. 1 shows sphere as a solid line and, in broken lines, the principal curvatures $1/R_1$ and $1/R_2$. The values are normalized to the origin, where mean sphere is actually equal to 5.21 diopters. It is seen firstly that the solid line and the broken lines merge—which is characteristic of a cylinder which is nil on the axis of the lens.

It may then be noted that mean sphere on the axis is substantially constant over the upper half of the lens. More precisely, in the example of FIG. 1, the difference between mean sphere on the axis in the upper part of the lens and mean sphere at the origin is less than or equal to 0.1 diopters. Mean sphere variation on the axis in the upper part of the lens is also less than or equal to 0.1 diopters. This characteristic ensures that the lens, in its upper part and on the axis, is equivalent to a unifocal lens. In other words, the power progression is realized in the lower part of the lens.

Mean sphere then increases, for y ordinate values between 0 mm and −14 mm. For values below y=−14 mm, mean sphere is substantially constant; with a value of the order of 0.85 diopters. Mean sphere variation on the axis in this lower part of the lens is less than or equal to 0.1 diopters.

It is therefore possible to define on the lens a power progression; this corresponds either to the difference in power between two upper and lower reference points for far and near vision, or to a difference between the substantially constant power value in the lower part of the lens, on the axis, and the substantially constant power value in the upper part of the lens, on the axis. More generally, power progression can be defined as the difference between the maximum and minimum power values on the axis of the lens; this definition also applies to mean sphere in the example of a lens characterized by a complex surface. In the example of FIG. 1, this value of power progression between maximum and minimum values is 0.90 diopters. It is also possible to define a progression length by analogy with the progression length of multifocal lenses. Such progression length is the vertical distance—or the difference in ordinate values—between the optical center of the lens and a point on the axis at which a difference in power compared to that at the optical center is equal to 85% of power progression between its maximum and minimum values. In the example of FIG. 1, applying this definition to a lens characterized by a complex surface, a mean sphere of 0.85×0.90 diopters, i.e. 0.765 diopters, is reached for an ordinate point y=approximately −12 mm.

The graph of FIG. 1 has a similar appearance to that of a graph of power along the meridian of a multifocal ophthalmic lens. However, the graph shows that the lens does not strictly speaking have a near-vision region. In fact, the value of the power progression on the lens—or of mean sphere progression on the complex surface—is 0.90 diopters. This value is less than the addition prescribed for the wearer, in other words, less than the difference between the power prescribed for the wearer in near vision and the power prescribed for the wearer in far vision; consequently there is no region in which the wearer is subjected to a power correction which corresponds to the power prescription in near vision. Moreover, the graph shows that the lens has a progression length of 12 mm, as indicated above. This length is less than the usual progression lengths for progressive multifocal lenses, which are of the order of 13 mm or more. Finally, as discussed below, the lens has high cylinder and cylinder slope values in the lower part of the lens, on either side of the axis; these values are reached for points of the lens close to the axis, in the lower part of the lens. Thus there is no near-vision region which is as wide as possible, as is found in the state of the art.

Figure 2:
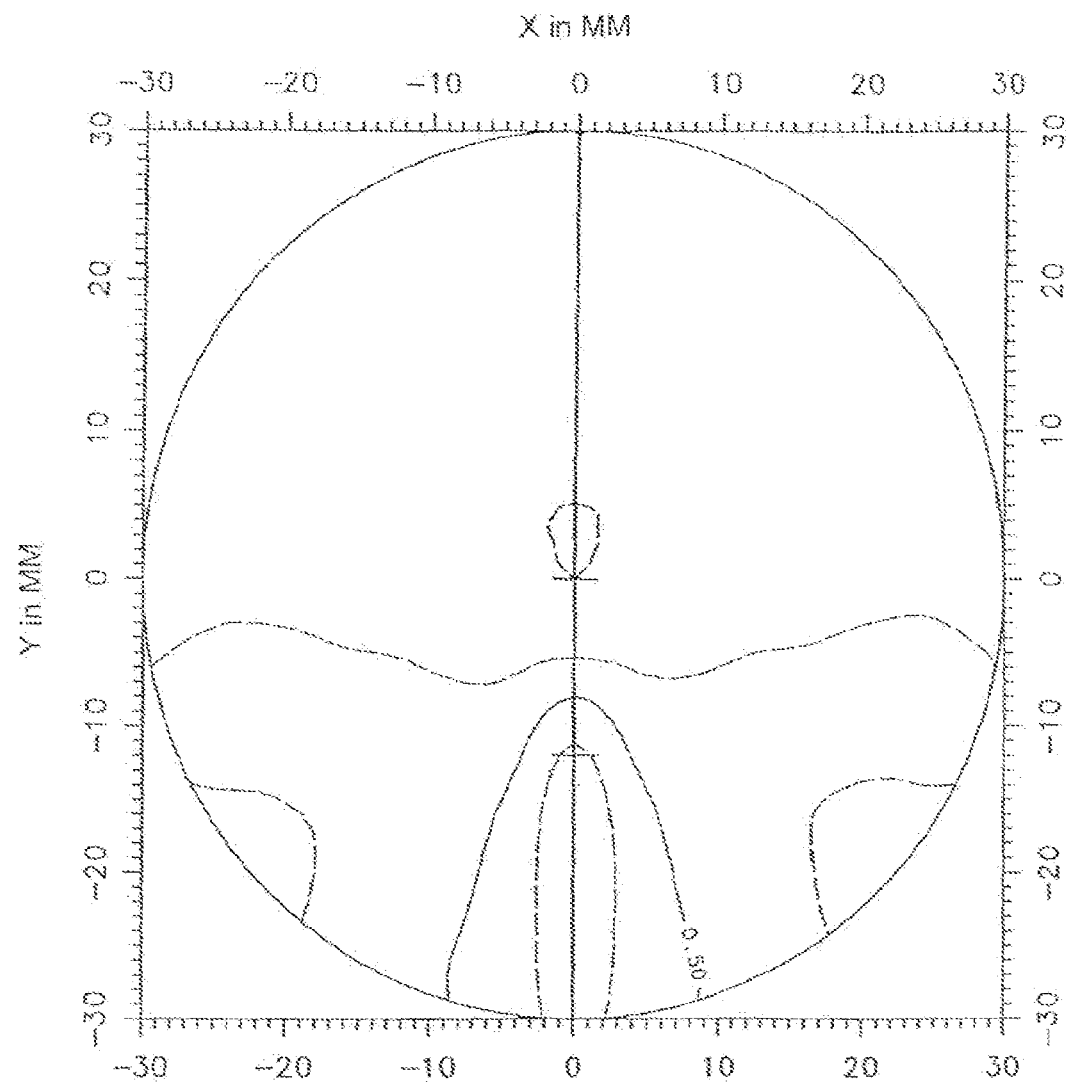
FIG. 2 is a mean-sphere map of the lens of FIG. 1.

FIG. 2 shows a mean-sphere map of the lens of FIG. 1; as is customary, isosphere lines are plotted in FIG. 2 in an orthonormalized reference frame; these lines are formed from points having the same value of mean sphere. In FIG. 2 the 0 diopter, 0.25 diopter, 0.50 diopter, 0.75 diopter isosphere lines are represented. The 0 diopter isosphere line passes through the center of the lens and cuts the axis at an ordinate point of 4 mm; inside this line, sphere is slightly less than sphere at the origin of the reference frame. The 0.25 diopter isosphere line extends substantially horizontal to a y-axis value of the order of −5 mm. The 0.50 diopter isosphere line is marked on FIG. 2. The 0.75 diopter isosphere line extends in the lower part of the lens, around the axis.

Figure 3:
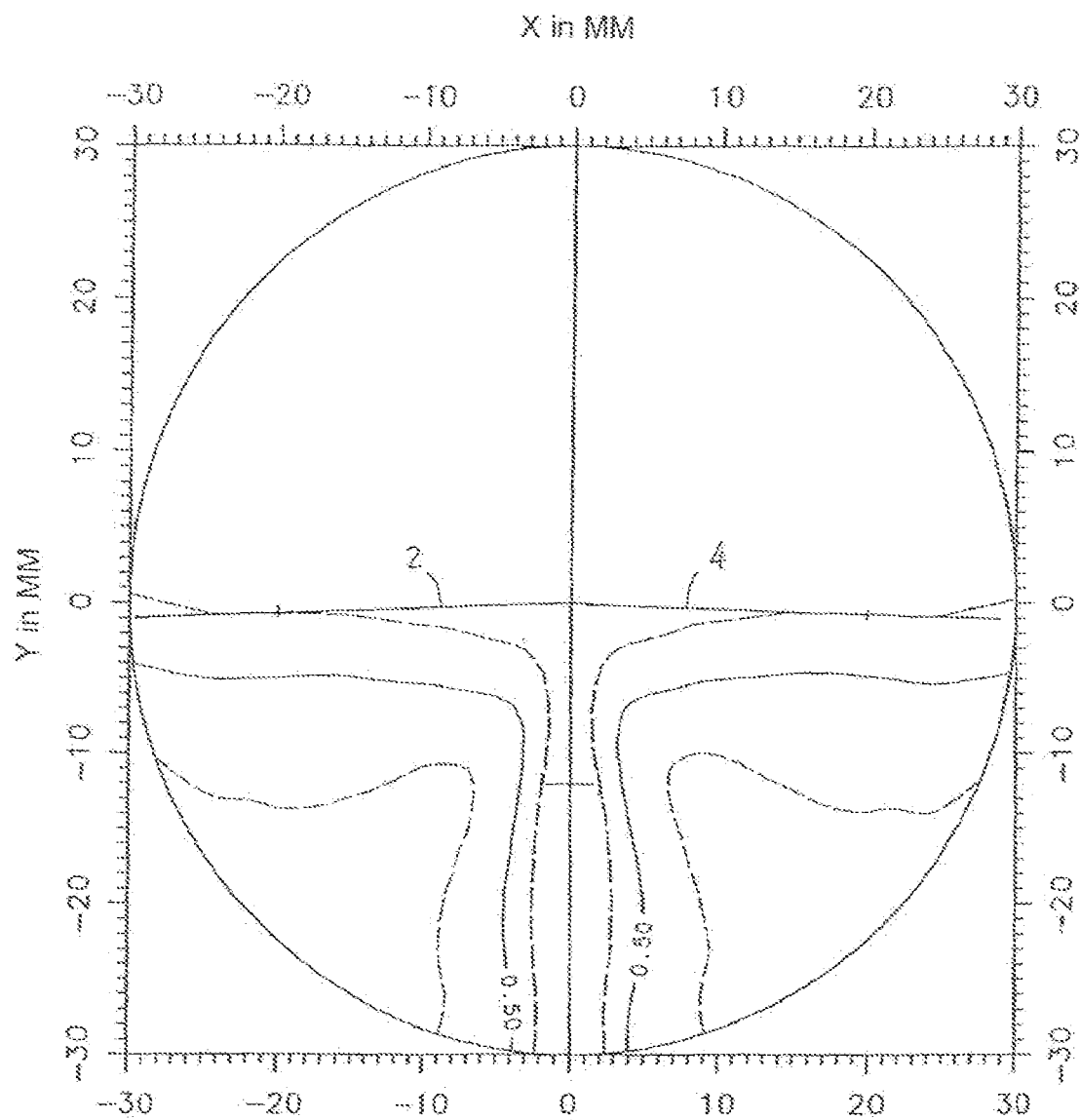
FIG. 3 is a cylinder map of the lens of FIG. 1.

FIG. 3 shows a cylinder map of the lens of FIG. 1. The 0.25 diopter, 0.50 diopter and 0.75 diopter isocylinder lines are represented in the figure. These lines are symmetrical relative to the vertical axis of the lens. Compared to a state of the art progressive multifocal lens for a presbyopic wearer it is noted that the far-vision region is very unimpeded: the 0.50 diopter isocylinder lines are in the lower part of the lens, at y-axis values below −4 mm. It is also noted that the isocylinder lines are, in the lower part of the lens, substantially parallel; there is therefore no near-vision region created by an enlargement of the region between the isocylinder lines at the level of a reference point for near vision. FIG. 2 also shows that the isocylinder lines are, for ordinates above −10 mm, substantially parallel and horizontal. This horizontality of the isocylinder lines facilitates peripheral vision and dynamic vision in the far-vision region. The lens therefore provides a wide far-vision region which is very unimpeded laterally as well as a good dynamic vision in far vision.

The intermediate vision region generally starts, for a progressive multifocal lens, at the level of the fitting cross, i.e. 4 mm above the optical center of the lens. This is where power progression starts. By contrast, as is shown in FIG. 1, in the lens of the invention, power progression really only starts below the center of the lens which constitutes the centering point of the lens. The far-vision region is therefore situated on the lens of the invention lower than in a conventional multifocal progressive lens, relative to the geometrical center of the lens.

In the lower part of the lens, the lens has a corridor suited to intermediate vision; as indicated above, the power (or mean sphere) on the meridian in the lower part of the lens is substantially constant and corresponds to the power prescribed for the wearer for viewing at a distance of the order of 80 cm. The lens therefore provides the correction necessary for intermediate vision.

From a quantitative point of view, it is possible to define the far-vision region, in the upper part of the lens, as the angular sector the apex of which is the center of the lens and the sides of which touch the 0.25 diopter isocylinder lines. In other words it is the angular sector apex the origin, having the widest possible angle and containing only cylinder points less than or equal to 0.25 diopters. The far-vision region can also be defined as the region of the lens extending, in the upper part of the lens, inside an angular sector the apex of which is the geometrical center of the lens and the edges of which pass through the intersection of the 0.25 diopter isocylinder lines with a circle with a diameter of 40 mm. In FIG. 3 the lines 2 and 4 which limit this angular sector are shown. The angle at the center is of the order of 183°, the lines 2 and 4 being virtually horizontal. Sphere variations in the far-vision region are of the order of 0.024 diopters.

In the lower part of the lens, the 0.25 and 0.50 diopter isocylinder lines are virtually parallel and vertical. On the right-hand side of the lens, the 0.25 diopter isocylinder line, in the lower part of the lens with an ordinate less than −5 mm, has abscissae comprised between 1 and 3 mm. The abscissa variation is therefore less than or equal to 2 mm. Likewise, for ordinates less than −7 mm, the 0.50 diopter isocylinder line has abscissa values between 3 and 5 mm. The abscissa variation is again less than or equal to 2 mm. The maximum width between the 0.50 diopter isocylinder lines is of the order of 10 mm, for an ordinate of the order of −22 mm. Thus the lens region with the maximum width between the 0.50 diopter isocylinders cannot constitute a near-vision region similar to that defined on all-purpose multifocal ophthalmic lenses of the state of the art; compared to such lenses it extends too far down on the lens and over an insufficient width.

Figure 4:
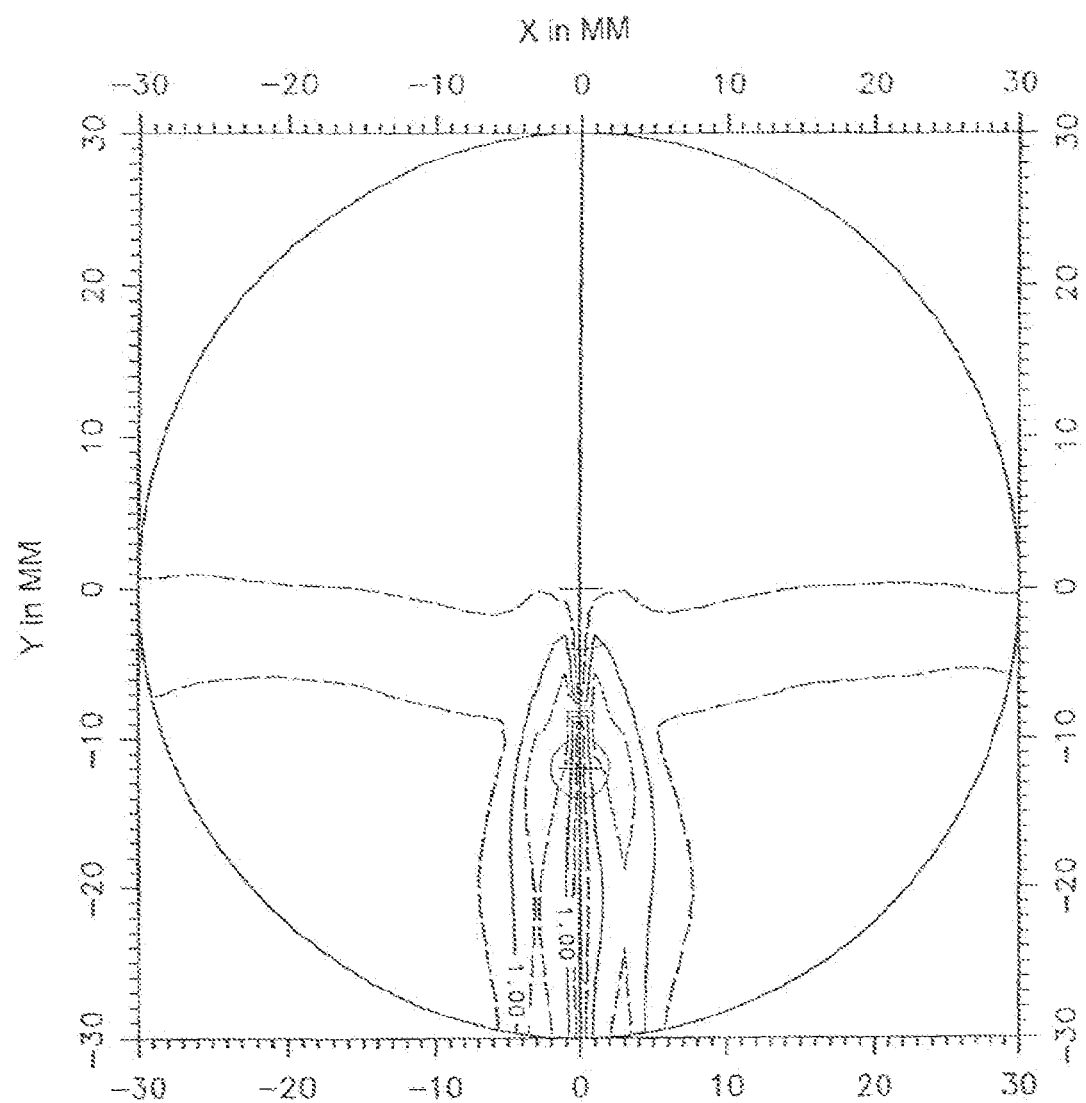
FIG. 4 is a cylinder slope map of the lens of FIG. 1.
Figure 5:
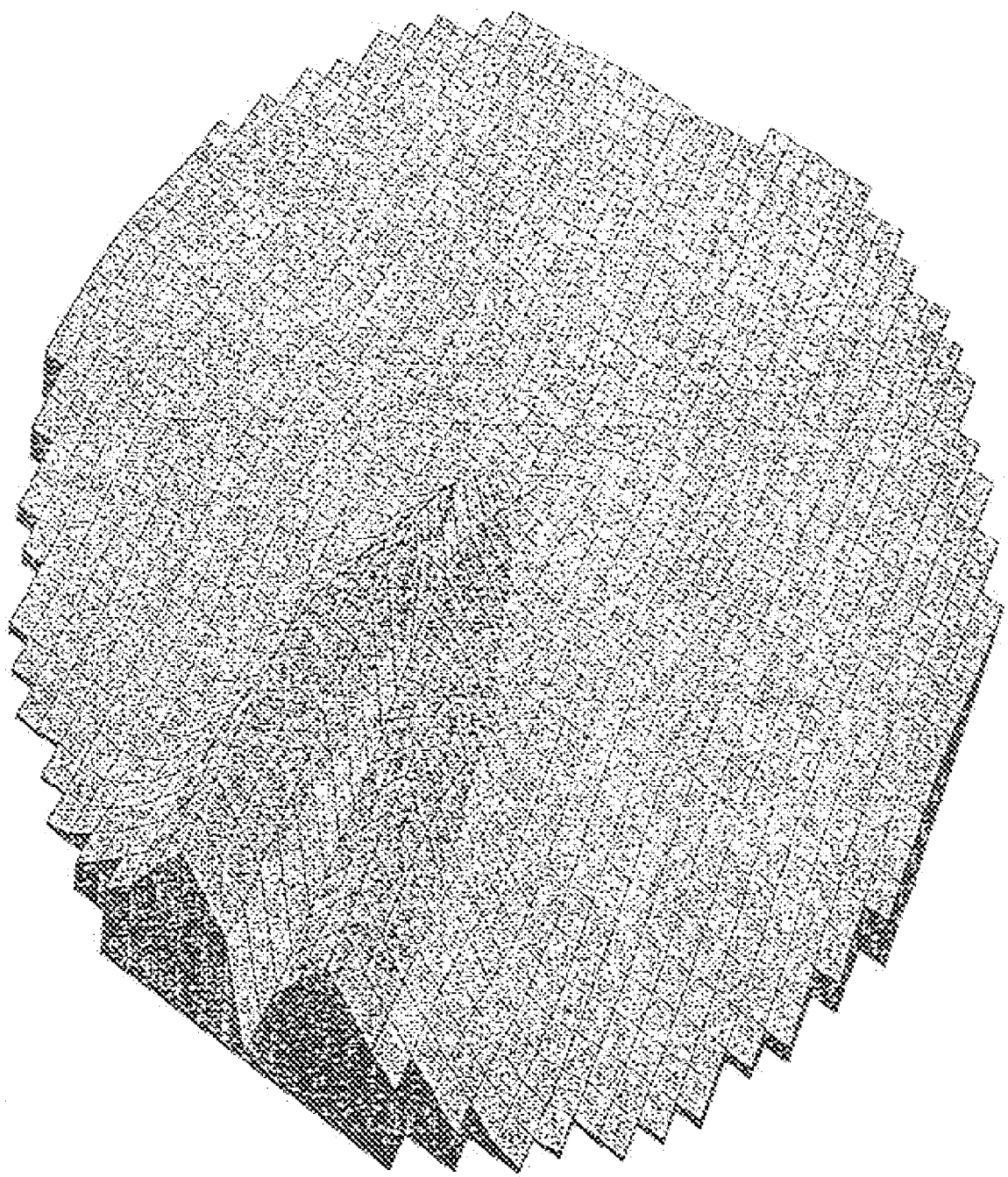
FIG. 5 is a three-dimensional perspective representation of the map of FIG. 4.
Figure 6:
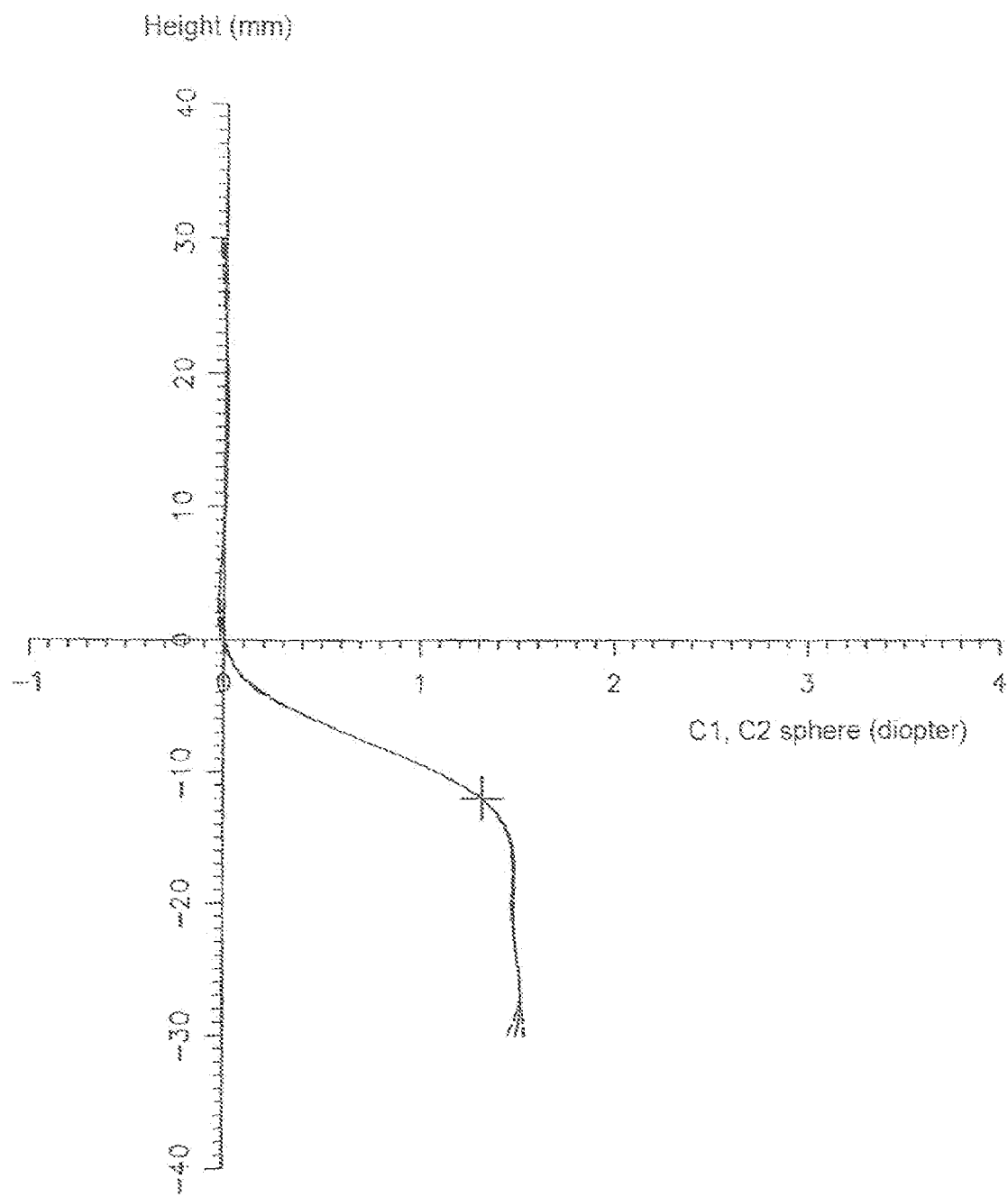
FIGS. 6 to 10 are similar to FIGS. 1 to 5 but for a lens according to a second embodiment of the invention.

FIG. 4 shows a cylinder slope map of the lens of FIG. 1, while FIG. 5 is a three-dimensional perspective view of the map of FIG. 4. FIG. 4 shows the lines formed by the points having the same cylinder slope values, hereafter called cylinder isoslopes. In the FIG. the 0.50 diopter/mm, 1 diopter/mm and 1.5 diopter/mm isoslopes are represented. FIGS. 4 and 5 show that the cylinder slope is substantially nil in all of the upper part of the lens, above the center. This facilitates dynamic vision and peripheral vision in the upper part of the lens. These FIGS. also show that the cylinder slope values are greatest in the lower part of the lens, for ordinate values below y=−3 mm, for abscissa values of the order of ±5 mm. Once again, these values concentrated around the axis prevent any near vision other than on the axis itself FIG. 5 shows how the cylinder slope values are greatest on either side of the axis, in the lower part of the lens. Aberrations are thus concentrated in the lower part of the lens which is not used.

The fact that the isocylinder lines are substantially horizontal in the median part of the lens and substantially vertical in the lower part of the lens can also be expressed by the cylinder gradient values, in the upper part of the lens which corresponds to the far-vision region and in the lower-right and left parts of the lens. In the example of FIG. 4, the cylinder gradient is less than 0.50 diopter/mm in the far-vision region as defined above, the cylinder gradient is also less than this value in the upper part of the lens, for ordinates greater than or equal to 2 mm, whatever the abscissa values. Moreover, in the lower right and left parts of the lens, defined by the inequalities y≦−10 mm and x≧10 mm (for the right-hand part in the figure) or x≦−10 mm (for the left-hand part in the figure)

cylinder gradient is also less than or equal to 0.50 diopter/mm. Cylinder gradient has values less than or equal to 1 diopter/mm over the whole of the surface of the lens, except on the part of the lens around the vertical, in the lower part of the lens. The values greater than or equal to 1 diopter/mm are reached in a vertical band with a width less than 10 mm, in the lower part of the lens (y≦0).

FIGS. 6 to 10 are views similar to those of FIGS. 1 to 5, but for a lens having a power progression of 1.25 diopters on the complex surface. This power progression is, as in the preceding example, less than the wearer's addition prescription.

FIG. 6 again shows the characteristics already shown in FIG. 1—except that mean sphere progression on the meridian is of the order of 1.25 diopters and no longer 0.75 diopters. Mean sphere at the origin is 5.21 diopters.

Figure 7:
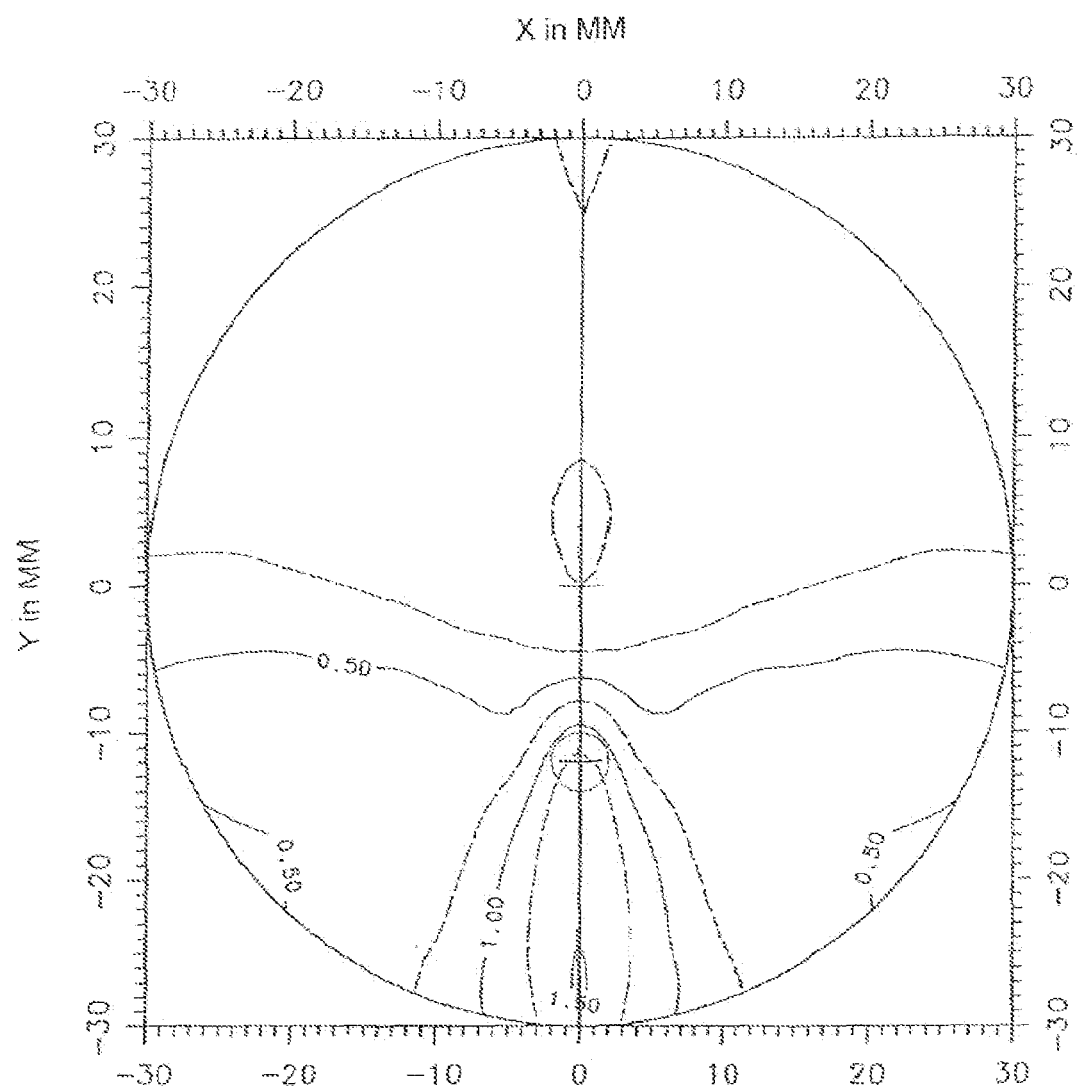
Figure 8:
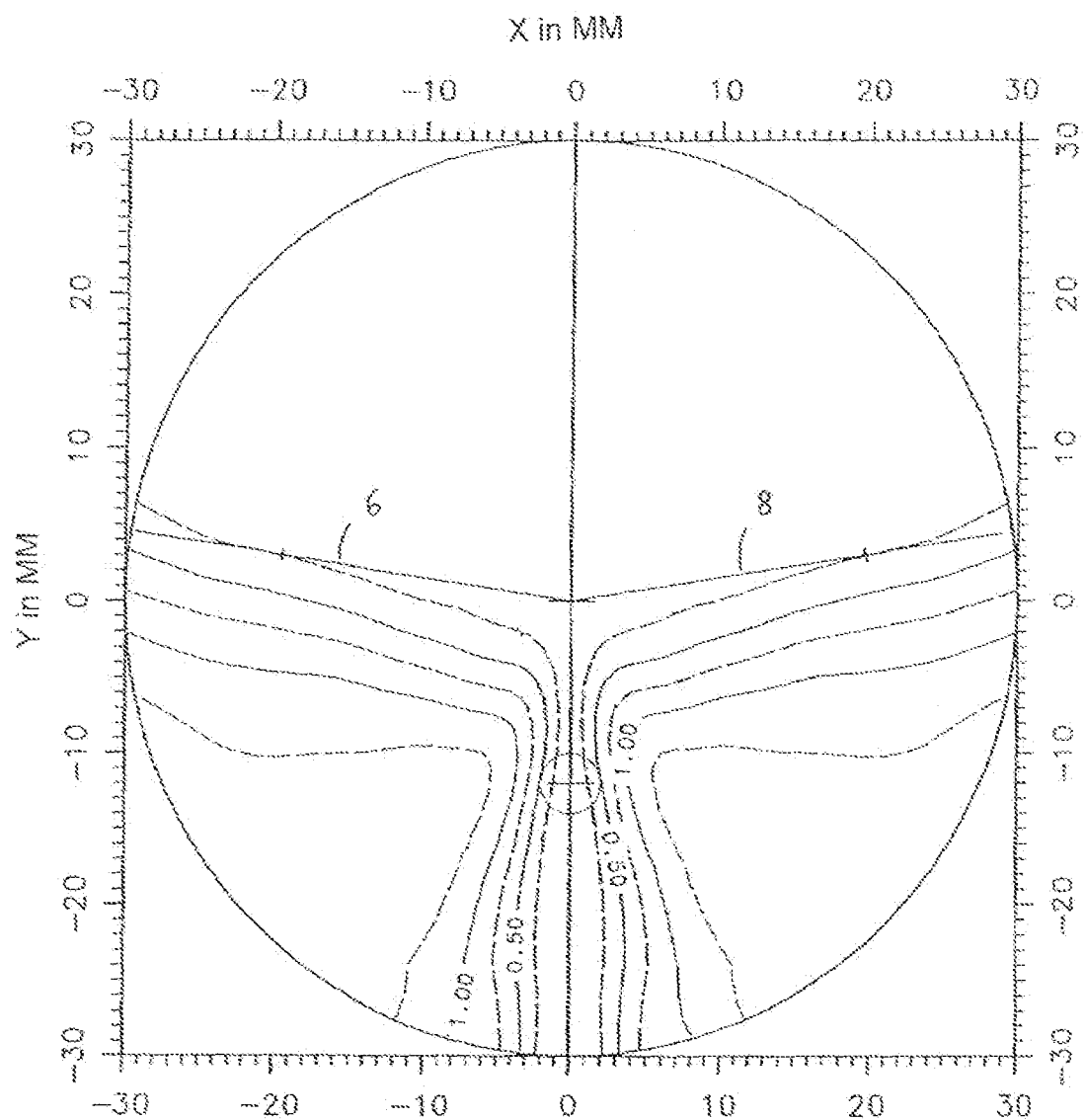

FIG. 7 shows the 0.25 to 1.50 diopter isosphere lines with a pitch of 0.25 diopters. FIG. 8 shows the 0.25 to 1.25 diopter isocylinder lines with a pitch of 0.25 diopters. As in FIG. 3, the lines 6 and 8 are represented delimiting an angular sector containing the cylinder points less than 0.25 diopters in a circle with a diameter of 40 mm centered on the geometrical circle of the lens. The angle at the center of this sector is of the order of 162° with a diameter of 40 mm. FIG.

8 and FIG. 3 confirm that the 0.25 and 0.50 diopter isocylinder lines are virtually parallel (the same inequalities being confirmed) and that the maximum width between the 0.50 diopter isocylinder lines is of the order of 10 mm. Variations in sphere in the far-vision region are of the order of 0.077 diopters.

Figure 9:
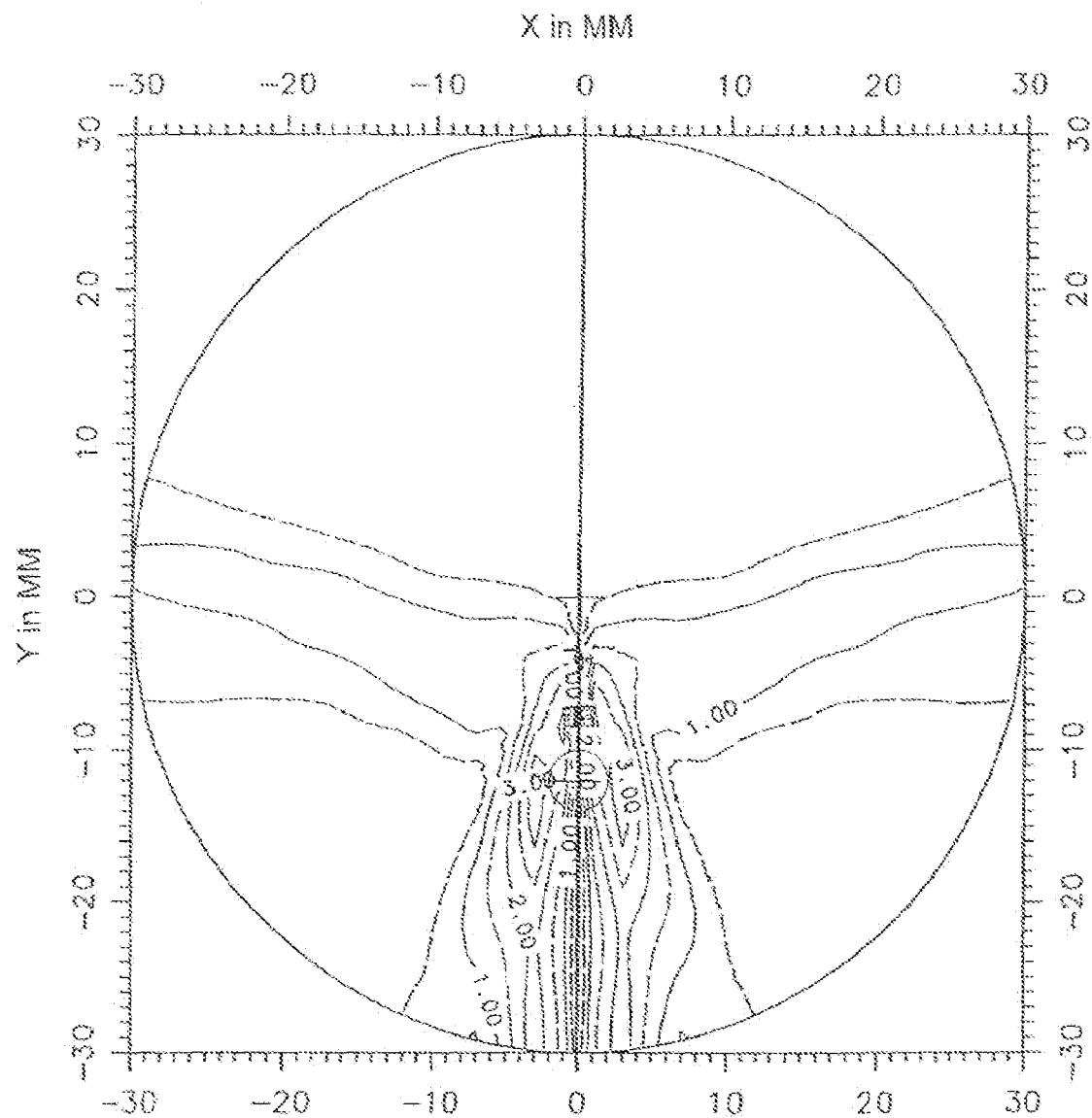
Figure 10:
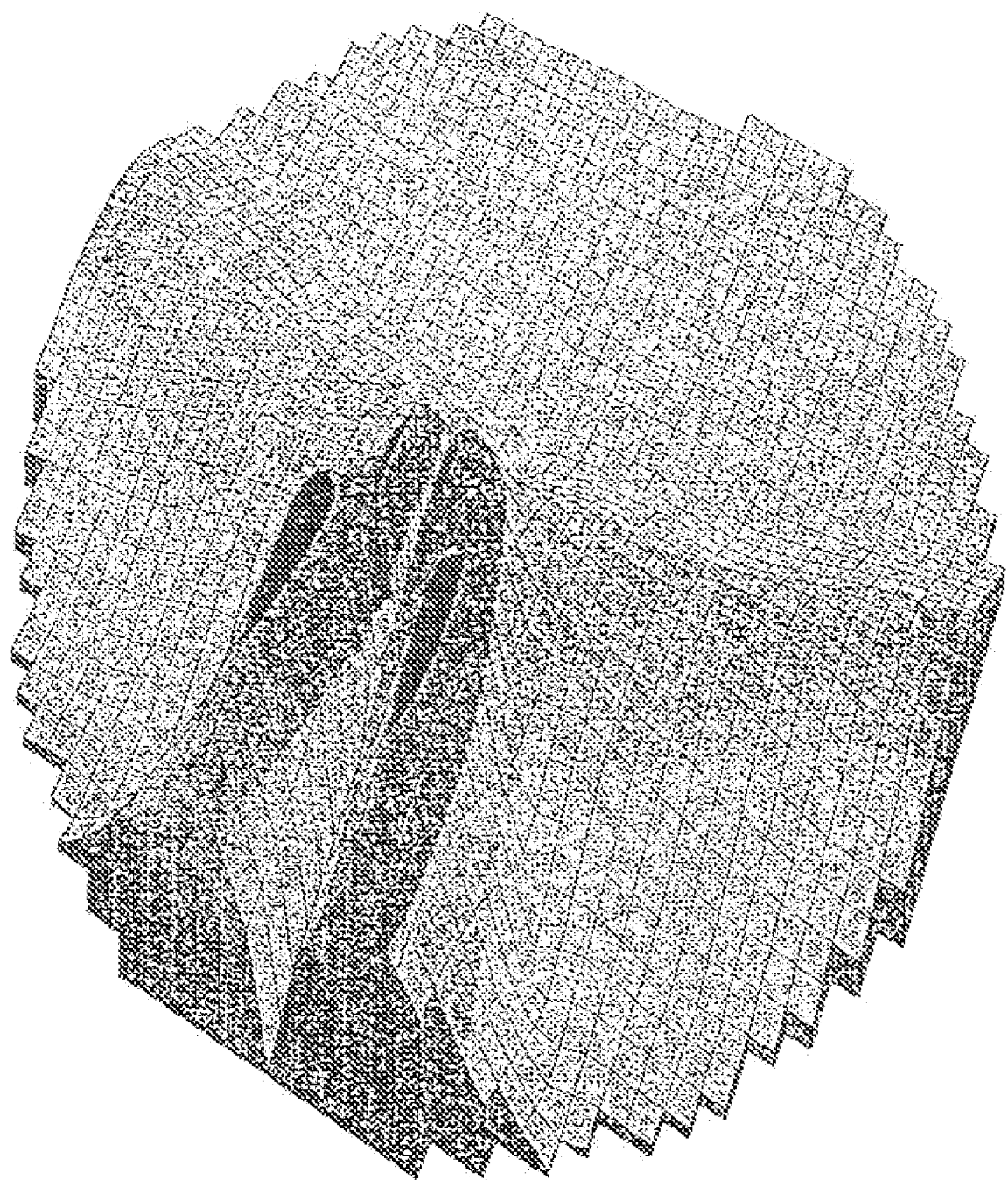

FIGS. 9 and 10 are similar to FIGS. 4 and 5. Because of the larger value of sphere progression over the surface, cylinder gradient also reaches greater values in the second embodiment than in the first; FIG. 9 shows the 0.50 to 3.00 diopters/mm isoslopes with a pitch of 0.50 diopters/mm. In the far-vision region, defined as indicated above, cylinder slope (or cylinder gradient) is still less than or equal to 0.50 diopters/mm; this inequality is also confirmed in the upper part of the lens for ordinates greater than or equal to 8 mm, whatever the abscissa values. The cylinder gradient is less than 1 diopter/mm for the part of the lens with an ordinate greater than or equal to 5 mm. in the lower right and left parts of the lens, defined as with reference to FIG. 4, the cylinder gradient is also less than or equal to 1 diopter/mm. Finally, cylinder gradient has values less than or equal to 2 diopter/mm over the whole surface of the lens, except over the part of the lens around the vertical in the lower part of the lens. Values greater than or equal to 2 diopter/mm are reached in a vertical band with a width less than 10 mm, in the lower part of the lens ($y \leq 0$).

The lens of FIGS. 1 to 5 or 6 to 10 is prescribed taking account of wearer prescription for far vision as well as power addition. The addition value is not used however for a reference point in near vision, but simply in order to choose the lens of FIGS. 1 to 5 or that of FIGS. 6 to 10. In both cases, power progression over the lens is less than the wearer's addition prescription. Typically, the lens of FIGS. 1 to 5 is chosen for a presbyopic wearer having an addition prescription between 1 and 1.75 diopters and the lens of FIGS. 6 to 10 for a presbyopic wearer having an addition prescription of 2 diopters or more.

In far vision, the lens provides the wearer with a correction which corresponds to the prescription. The fitting of the lens differs from the fitting of a progressive multifocal lens of the state of the art in so far as the lens is fitted in the frame in such a way as to have the necessary power in far vision at the optical center. The centering point is thus at the optical center of the lens or at the geometrical center of the lens before trimming—whereas in a standard ophthalmic lens the fitting cross is above the optical center or the geometrical center of the lens. The necessary power can be obtained, as in the state of the art, by the machining of a rear face of the lens in order to ensure that the power is identical to the prescribed power.

The fitting of the lens therefore requires only a standard measurement of the far-vision interpupillary half-distance, as well as a height measurement in order to determine the height at which the center of the lens must be placed in the frame. The center of the lens is therefore used as the centering point for fitting. The lens is preferably fitted with the axis of symmetry orientated vertically, thus allowing the same lens to be used for the right eye and for the left eye. The fitting of the lens in the frame is carried out simply by measuring the position in the frame of the subject's glance in far vision; this measurement is carried out in a standard manner, the subject wearing the frame and looking to infinity. The lens is then fitted in the frame in such a way that the optical center is located at the measured position.

As regards the optics, the lens provides the wearer with a correction suitable for driving a vehicle. In fact the invention is based on an analysis of the visual targets of wearers in a motor vehicle and of the dynamic behavior of wearers relative to these targets. This analysis firstly involves identifying visual targets which can comprise the rear-view mirrors, the speedometer and the knob for controlling the air flow and/or the car radio. Analysis of these targets—in terms of angular positions and proximity relative to the driver—shows that in fact essentially only far vision is required—for driving and the rear-view mirrors—as well as intermediate vision—for the other targets. Typically for this activity, near vision is only rarely required. The lens makes it possible to ensure suitable correction by means of a wide near-vision region and an adequate intermediate-vision region.

Analysis of the dynamic behavior of wearers when driving shows that they move their head very little, probably because of the thought of danger. For this same reason, the period during which their eyes are turned away is very short. This eye/head strategy is easily respected in the lens of the invention thank to an extended far-vision region with low cylinder values in the lateral regions. This facilitates lateral vision and dynamic vision even for very short lateral shifts of glance.

Intermediate vision is used when driving a vehicle for the navigation equipment—speedometer, etc. This equipment is generally arranged in front of the driver and the lens of the invention ensures an appropriate correction so that the wearer can, still virtually without moving his head, see the speedometer clearly. This is ensured by the small progression length and by the use of a vertical meridian. Intermediate vision is also used for other types of equipment—car radio or the air circulation or air conditioning controls. However it turns out that this equipment is only used in practice when stopped, with a viewing strategy which involves more movements of the head. The fact that the lens only has an intermediate vision corridor with a limited width is therefore not an obstacle.

The lens of the two examples described above can be obtained by optimization of a surface according to the optimization methods known per se and described in the documents of the state of the art cited above in relation to progressive multifocal lenses. For the optimization it is possible to use one or more of the criteria described in the above description with reference to FIGS. 1 to 10, and in particular:

a mean sphere progression of 0.50 diopters or more; the 0.75 and 1.25 diopter values proposed in the examples can be used or other values in the [0.50; 0.90] or [1.05; 1.50] diopter ranges;

a far-vision region—points where cylinder is less than or equal to 0.25 diopters in the upper part of the lens—covering an angular sector of at least 160° centered on the optical center; it is possible to envisage an angular sector of at least 180° for a mean sphere progression in the [0.50; 0.90] diopters range;

a substantially constant mean sphere on the umbilical meridian in the far-vision region, for example mean sphere variations less than or equal to 0.2 or 0.1 diopters above the optical center of the lens;

a progression length less than or equal to 12 mm, where progression length is defined as the vertical distance between the optical center and the point on the meridian for which the difference in mean sphere mean sphere at the optical center is 85% of mean sphere progression.

These criteria can be combined with others, in particular with one or more of the criteria proposed in the previous examples. One or more of the following criteria can also be used:

sphere variations less than or equal to 0.03 diopters in the far-vision region for a mean sphere progression in the range [0.50; 0.90] diopters;

sphere variations less than or equal to 0.08 diopters in the far-vision region, for a mean sphere progression in the range [1.05; 1.50] diopters;

a maximum cylinder in the far-vision region less than mean sphere progression;

a substantially constant mean sphere on the meridian in the lower part of the lens, for example for points of the meridian more than 15 mm below the optical center of the lens.

The choice of these criteria makes it possible to obtain a lens by optimization. A person skilled in the art easily understands that the lens in question does not necessarily have values corresponding exactly to the set criteria; for example it is not essential that the upper value of mean sphere variation is reached.

In the above optimization examples, it was proposed to optimize only one of the faces of the lenses. It is clear that in all these examples the role of the front and rear surfaces can be easily switched. The sphere progression can also equally well be allocated to one or other of the two surfaces of the lens, or partially to one face and the other, once optical targets similar to those of the lens described are reached.

The invention claimed is:

1. An ophthalmic lens intended for far vision and intermediate vision, having a complex surface with an optical center, a substantially umbilical meridian, a mean-sphere progression on the meridian greater than or equal to 0.5 diopters, the complex surface having:
   in its upper part, a far-vision region formed by points where cylinder is less than or equal to 0.25 diopters and covering an angular sector centered on the optical center and with a 160° angle;
   substantially constant mean sphere on the meridian in the far-vision region;
   a progression length less than or equal to 12 mm, progression length being defined as a vertical distance between the optical center and a point on the meridian for which mean sphere is higher by 85% of said mean-sphere progression than mean sphere at the optical center.

2. The lens according to claim 1, wherein the meridian is rectilinear.

3. The lens according to claim 2, wherein the complex surface is symmetrical relative to the meridian.

4. The lens according to claim 1, having, for a part of the lens more than 5 mm below the optical center, a distance between 0.50 diopter isocylinder lines less than or equal to 10 mm.

5. The lens according to claim 1, having, in the far-vision region, a mean sphere variation less than or equal to 0.025 diopters, for a mean sphere progression less than or equal to 0.90 diopters.

6. The lens according to claim 1, having, in the far-vision region, a mean sphere progression less than or equal to 0.08 diopters, for a mean sphere progression between 1.05 and 1.40 diopters.

7. The lens according to claim 1, having a mean sphere progression between 0.05 and 0.9 diopters.

8. The lens according to claim 1, having a mean sphere progression between 1.05 and 1.40 diopters.

9. The lens according to claim 7 or 8, wherein wearer's addition prescription is greater than lens mean sphere progression.

10. Visual apparatus comprising at least one ophthalmic lens intended for far vision and intermediate vision, having a complex surface with an optical center, a substantially umbilical meridian, a mean-sphere progression on the meridian greater than or equal to 0.5 diopters, the complex surface having:
    in its upper part, a far-vision region formed by points where cylinder is less than or equal to 0.25 diopters and covering an angular sector centered on the optical center end with a 160° angle;
    substantially constant mean sphere on the meridian in the far-vision region;
    a progression length less than or equal to 12 mm, progression length being defined as a vertical distance between the optical center and a point on the meridian for which mean sphere is higher by 85% of said mean-sphere progression than mean sphere at the optical center.

11. A method for correcting the vision of a presbyopic subject which comprise providing the subject with, or the wearing by the subject of, visual apparatus comprising at least one ophthalmic lens intended for far vision and intermediate vision, having a complex surface with an optical center, a substantially umbilical meridian, a mean-sphere progression on the meridian greater than or equal to 0.5 diopters, the complex surface having:
    in its upper part, a far-vision region formed by points where cylinder is less than or equal to 0.25 diopters and covering an angular sector centered on the optical center and with a 160° angle;
    substantially constant mean sphere on the meridian in the far-vision region;
    a progression length less than or equal to 12 mm, progression length being defined as a vertical distance between the optical center and a point on the meridian for which mean sphere is higher by 85% of said mean-sphere progression than mean sphere at the optical center.

12. The method according to claim 11, wherein a lens of the apparatus has a mean sphere progression over the lower surface thereof less than the difference in the near-vision power and far-vision power prescribed for the wearer.

13. A method for fitting an ophthalmic in visual apparatus, said lens being intended for far vision and intermediate vision, having a complex surface with an optical center, a substantially umbilical meridian, a mean-sphere progression on the meridian greater than or equal to 0.5 diopters, the complex surface having:
    in its upper part, a far-vision formed by points where cylinder is less than or equal to 0.25 diopters and covering an angular sector centered on the optical center and with a 160° angle;
    substantially constant mean sphere on the meridian in the far-vision region;
    a progression length less than or equal to 12 mm, progression length being defined as a vertical distance between the optical center and a point on the meridian for which mean sphere is higher by 85% of said mean-sphere progression than mean sphere at the optical center,
    comprising:
    measuring the position in the apparatus of the subject's glance in far vision, and
    fitting the said lens in the apparatus, with the optical center thereof at the measured position.

* * * * *